(12) United States Patent
Wu et al.

(10) Patent No.: US 11,481,418 B2
(45) Date of Patent: Oct. 25, 2022

(54) NATURAL QUESTION GENERATION VIA REINFORCEMENT LEARNING BASED GRAPH-TO-SEQUENCE MODEL

(71) Applicants: International Business Machines Corporation, Armonk, NY (US); RENSSELAER POLYTECHNIC INSTITUTE, Troy, NY (US)

(72) Inventors: Lingfei Wu, Elmsford, NY (US); Yu Chen, Troy, NY (US); Mohammed J. Zaki, Troy, NY (US)

(73) Assignees: International Business Machines Corporation, Armonk, NY (US); RENSSELAER POLYTECHNIC INSTITUTE, Troy, NY (US)

( * ) Notice: Subject to any disclaimer, the term of this patent is extended or adjusted under 35 U.S.C. 154(b) by 198 days.

(21) Appl. No.: 16/843,975

(22) Filed: Apr. 9, 2020

(65) Prior Publication Data
US 2021/0209139 A1    Jul. 8, 2021

Related U.S. Application Data

(60) Provisional application No. 62/956,488, filed on Jan. 2, 2020.

(51) Int. Cl.
*G06N 5/02* (2006.01)
*G06F 16/95* (2019.01)
(Continued)

(52) U.S. Cl.
CPC ...... *G06F 16/3329* (2019.01); *G06F 16/9024* (2019.01); *G06F 17/16* (2013.01);
(Continued)

(58) Field of Classification Search
CPC .............. G06F 16/3329; G06F 40/30; G06F 16/90332; G06F 40/205; G06F 16/3344;
(Continued)

(56) References Cited

U.S. PATENT DOCUMENTS 9,330,084 B1   5/2016   Kadambi et al.
9,348,817 B2   5/2016   Bohra et al.
(Continued)

OTHER PUBLICATIONS

Xu et al, "Exploiting rich syntactic information for semantic parsing with graph-to-sequence model", Aug. 2018, arXiv preprint arXiv: 1808.07624. Aug. 23, 2018, pp. 1-7.*
(Continued)

*Primary Examiner* — Olujimi A Adesanya
(74) *Attorney, Agent, or Firm* — Anthony Curro; Otterstedt & Kammer PLLC

(57) ABSTRACT

For a passage text and a corresponding answer text, perform a word-level soft alignment to obtain contextualized passage embeddings and contextualized answer embeddings, and a hidden level soft alignment on the contextualized passage embeddings and the contextualized answer embeddings to obtain a passage embedding matrix. Construct a passage graph of the passage text based on the passage embedding matrix, and apply a bidirectional gated graph neural network to the passage graph until a final state embedding is determined, during which intermediate node embeddings are fused from both incoming and outgoing edges. Obtain a graph-level embedding from the final state embedding, and decode the final state embedding to generate an output sequence word-by-word. Train a machine learning model to generate at least one question corresponding to the passage text and the answer text, by evaluating the output sequence with a hybrid evaluator combining cross-entropy evaluation and reinforcement learning evaluation.

20 Claims, 9 Drawing Sheets

(51) Int. Cl.

| | |
|---|---|
| G06F 16/9032 | (2019.01) |
| G06F 16/332 | (2019.01) |
| G06N 20/00 | (2019.01) |
| G06F 40/30 | (2020.01) |
| G06F 17/16 | (2006.01) |
| G06F 16/901 | (2019.01) |
| G06F 17/18 | (2006.01) |
| G06N 3/04 | (2006.01) |

(52) U.S. Cl.
CPC ............. *G06F 17/18* (2013.01); *G06F 40/30* (2020.01); *G06N 3/04* (2013.01); *G06N 20/00* (2019.01)

(58) Field of Classification Search
CPC .......... G06F 40/20; G06N 20/00; G06N 5/02; G06N 3/0454; G06N 3/08; G06N 3/0445; G06N 3/084; G06N 3/02; G06N 5/022
See application file for complete search history.

(56) References Cited

U.S. PATENT DOCUMENTS

| | | | |
|---|---|---|---|
| 9,471,559 | B2 | 10/2016 | Castelli et al. |
| 9,569,488 | B2 | 2/2017 | Boyer et al. |
| 9,904,675 | B2 | 2/2018 | Kantor et al. |
| 10,339,167 | B2 | 7/2019 | Dole et al. |
| 2015/0199400 | A1 | 7/2015 | Wu |
| 2016/0358094 | A1* | 12/2016 | Fan ..................... G06F 16/3344 |
| 2017/0358295 | A1 | 12/2017 | Roux et al. |
| 2018/0260472 | A1 | 9/2018 | Kelsey et al. |
| 2018/0336183 | A1* | 11/2018 | Lee ........................... G06N 3/08 |
| 2018/0336198 | A1* | 11/2018 | Zhong .................... G06N 7/005 |
| 2019/0043379 | A1* | 2/2019 | Yuan .................... G06N 3/0445 |
| 2019/0258939 | A1* | 8/2019 | Min ........................ G06F 40/30 |
| 2022/0027707 | A1* | 1/2022 | Wu ........................... G06N 5/02 |

OTHER PUBLICATIONS

Ranzato et al, "Sequence level training with recurrent neural networks", 2015, arXiv preprint arXiv:1511.06732. Nov. 20, 2015, pp. 1-16.*

Ghosh, "Methods for Multi-hop Question Generation", May 2019, (Doctoral dissertation, Indian Institute of Technology, Madras), pp. 1-41.*

Hu et al, "Distant Supervised Why-Question Generation with Passage Self-Matching Attention", Jul. 2019, In2 019 International Joint Conference on Neural Networks (IJCNN) Jul. 14, 2019 (pp. 1-8). IEEE.*

Kumar et al, "Putting the horse before the cart: A generator-evaluator framework for question generation from text", 2018, . arXiv preprint arXiv:1808.04961. Aug. 15, 2018, pp. 1-10.*

Chen et al, "Natural question generation with reinforcement learning based graph-to-sequence model", Oct. 2019, arXiv preprint arXiv:1910.08832. Oct. 19, 2019, pp. 1-10.*

Chen et al, "Deep iterative and adaptive learning for graph neural networks", Dec. 2019, arXiv preprint arXiv: 1912.07832. Dec. 17, 2019, pp. 1-8.*

Xu et al, "Graph2seq: Graph to sequence learning with attention-based neural networks", 2018, pp. arXiv preprint arXiv:1804. 00823. Apr. 3, 2018, pp. 1-18.*

Li et al, "Paraphrase generation with deep reinforcement learning", Nov. 2017, arXiv preprint arXiv:1711.00279. Nov. 1, 2017, pp. 1-14.*

Ling et al. "Hierarchical graph matching networks for deep graph similarity learning", 2019, ICLR 2020 review, pp. 1-18.*

Zhou, et al., Neural question generation from text: A preliminary study, National CCF Conference on Natural Language Processing and Chinese Computing. Springer, Cham, 2017 pp. 1-6.

Song, et al., Leveraging context information for natural question generation, Proceedings of the 2018 Conference of the North American Chapter of the Association for Computational Linguistics: Human Language Technologies, vol. 2 (Short Papers), 2018 pp. 569-574.

Kim Y, Lee H, Shin J, Jung K. Improving neural question generation using answer separation. In Proceedings of the AAAI Conference on Artificial Intelligence Jul. 17, 2019 (vol. 33, pp. 6602-6609).

Liu B, Zhao M, Niu D, Lai K, He Y, Wei H, Xu Y. Learning to Generate Questions by Learning What not to Generate. InThe World Wide Web Conference May 13, 2019 (pp. 1106-1118).

Yu Chen, Lingfei Wu, Mohammed J. Zaki, Reinforcement Learning Based Graph-to-Sequence Model for Natural Question Generation, arXiv:1908.04942, Version 1, Aug. 14, 2019. (Grace Period Disclosure).

Yu Chen, Lingfei Wu, Mohammed J. Zaki, Reinforcement Learning Based Graph-to-Sequence Model for Natural Question Generation, arXiv:1908.04942, Version 2, Dec. 20, 2019.(Grace Period Disclosure).

Yu Chen, Lingfei Wu, Mohammed J. Zaki, Reinforcement Learning Based Graph-to-Sequence Model for Natural Question Generation, arXiv:1908.04942, Version 3, Feb. 16, 2020. (Grace Period Disclosure).

Daniel Beck, Gholamreza Haffari, and Trevor Cohn. Graph-to-sequence learning using gated graph neural networks. arXiv preprint arXiv:1806.09835, Jun. 26, 2018, 13 pages.

Guy Danon and Mark Last. A syntactic approach to domain-specific automatic question generation. arXiv preprint arXiv:1712.09827, Dec. 28, 2017, 10 pages.

Li Dong, Nan Yang, Wenhui Wang, Furu Wei, Xiaodong Liu, Yu Wang, Jianfeng Gao, Ming Zhou, and Hsiao-Wuen Hon. Unified language model pre-training for natural language understanding and generation. In Advances in Neural Information Processing Systems, pp. 13042-13054 (conference print pp. 1-13), Dec. 8, 2019.

Xinya Du, Junru Shao, and Claire Cardie. Learning to ask: Neural question generation for reading comprehension. arXiv preprint arXiv:1705.00106, Apr. 29, 2017, 11 pages total.

Zhihao Fan, Zhongyu Wei, Siyuan Wang, Yang Liu, and Xuanjing Huang. A reinforcement learning framework for natural question generation using bi-discriminators. In Proceedings of the 27th International Conference on Computational Linguistics, pp. 1763-1774, Aug. 20, 2018.

Michael Heilman and Noah A Smith. Good question! statistical ranking for question generation. In Human Language Technologies: The 2010 Annual Conference of the North American Chapter of the Association for Computational Linguistics, pp. 609-617. Association for Computational Linguistics, Jun. 2010.

Vishwajeet Kumar, Kireeti Boorla, Yogesh Meena, Ganesh Ramakrishnan, and Yuan-Fang Li. Automating reading comprehension by generating question and answer pairs. In Pacific-Asia Conference on Knowledge Discovery and Data Mining, pp. 335-348. Springer, 2018a (arXiv print pp. 1-12 Mar. 7, 2018 arXiv:1803. 03664v1).

Vishwajeet Kumar, Ganesh Ramakrishnan, and Yuan-Fang Li. Putting the Horse Before the Cart: A Generator-Evaluator Framework for Question Generation from Text. arXiv preprint arXiv:1808. 04961v5, Sep. 15, 2019 10 pages.

Iulian Vlad Serban, Alberto García-Durań, Caglar Gulcehre, Sungjin Ahn, Sarath Chandar, Aaron Courville, and Yoshua Bengio. Generating factoid questions with recurrent neural networks: The 30m factoid question-answer corpus. arXiv preprint arXiv:1603.06807, May 28, 2016 13 Pages.

Linfeng Song, Zhiguo Wang, and Wael Hamza. A unified query-based generative model for question generation and question answering. arXiv preprint arXiv:1709.01058, 2017 (Aug. 28, 2018 v. 2) 9 pages.

Xingwu Sun, Jing Liu, Yajuan Lyu, Wei He, Yanjun Ma, and Shi Wang Answer-focused and position-aware neural question generation. In Proceedings of the 2018 Conference on Empirical Methods in Natural Language Processing, pp. 3930-3939, Nov. 4, 2018.

Duyu Tang, Nan Duan, Tao Qin, Zhao Yan, and Ming Zhou. Question answering and question generation as dual tasks. arXiv preprint arXiv:1706.02027, Aug. 4, 2017, 9 pages.

(56) References Cited

OTHER PUBLICATIONS

Shiyue Zhang and Mohit Bansal. Addressing semantic drift in question generation for semi-supervised question answering. arXiv preprint arXiv:1909.06356, Sep. 13, 2019 15 pages.

Yao Zhao, Xiaochuan Ni, Yuanyuan Ding, and Qifa Ke. Paragraph-level neural question generation with maxout pointer and gated self-attention networks. In Proceedings of the 2018 Conference on Empirical Methods in Natural Language Processing, pp. 3901-3910, Nov. 4, 2018.

Vishwajeet Kumar, Ganesh Ramakrishnan, Yuan-Fang Li, SCAI Dec. 8, 2019, A Framework for Automatic Question Generation From Text Using Deep Reinforcement Learning, pp. 1-22.

\* cited by examiner

| Methods | Split-1 | | | | Split-2 | | | |
|---|---|---|---|---|---|---|---|---|
| | BLEU-4 | METEOR | ROUGE-L | Q-BLEU1 | BLEU-4 | METEOR | ROUGE-L | Q-BLEU1 |
| SeqCopyNet | – | – | – | – | 13.02 | – | 44.00 | – |
| NQG++ | – | – | – | – | 13.29 | – | – | – |
| MPQG+R* | 14.39 | 18.99 | 42.46 | 52.00 | 14.71 | 18.93 | 42.60 | 50.30 |
| AFPQA | – | – | – | – | 15.64 | – | – | – |
| s2sa-at-mp-gsa | 15.32 | 19.29 | 43.91 | – | 15.82 | 19.67 | 44.24 | – |
| ASs2s | 16.20 | 19.92 | 43.96 | – | 16.17 | – | – | – |
| CGC-QG | – | – | – | – | 17.55 | 21.24 | 44.53 | – |
| G2S$_{dyn}$+BERT+RL | 17.55 | 21.42 | 45.59 | 55.40 | 18.06 | 21.53 | 45.91 | 55.00 |
| G2S$_{sta}$+BERT+RL | 17.94 | 21.76 | 46.02 | 55.60 | 18.30 | 21.70 | 45.98 | 55.20 |

*FIG. 5*

| Methods | Syntactically correct | Semantically correct | Relevant |
|---|---|---|---|
| MPQG+R* | 4.34 (0.15) | 4.01 (0.23) | 3.21 (0.31) |
| G2S$_{sta}$+BERT+RL | 4.41 (0.09) | 4.31 (0.12) | 3.79 (0.45) |
| Ground-truth | 4.74 (0.14) | 4.74 (0.19) | 4.25 (0.38) |

*FIG. 6*

| Methods | BLEU-4 | Methods | BLEU-4 |
|---|---|---|---|
| G2S$_{dyn}$+BERT+RL | 18.06 | G2S$_{dyn}$ | 16.81 |
| G2S$_{sta}$+BERT+RL | 18.30 | G2S$_{sta}$ | 16.96 |
| G2S$_{sta}$+BERT-fixed+RL | 18.20 | G2S$_{dyn}$ w/o DAN | 12.58 |
| G2S$_{dyn}$+BERT | 17.56 | G2S$_{sta}$ w/o DAN | 12.62 |
| G2S$_{sta}$+BERT | 18.02 | G2S$_{sta}$ w/o BiGGNN, w/ Seq2Seq | 16.14 |
| G2S$_{sta}$+BERT-fixed | 17.86 | G2S$_{sta}$ w/o BiGGNN, w/ GCN | 14.47 |
| G2S$_{dyn}$+RL | 17.18 | G2S$_{sta}$ w/ GGNN-forward | 16.53 |
| G2S$_{sta}$+RL | 17.49 | G2S$_{sta}$ w/ GGNN-backward | 16.75 |

*FIG. 7*

Passage: for the successful execution of a project, effective planning is essential.
Gold: what is essential for the successful execution of a project?
$G2S_{sta}$ w/o BiGGNN (Seq2Seq): what type of planning is essential for the project?
$G2S_{sta}$ w/o DAN.: what type of planning is essential for the successful execution of a project?
$G2S_{sta}$: what is essential for the successful execution of a project?
$G2S_{sta}$+BERT: what is essential for the successful execution of a project?
$G2S_{sta}$+BERT+RL: what is essential for the successful execution of a project?
$G2S_{dyn}$+BERT+RL: what is essential for the successful execution of a project?

Passage: the church operates three hundred sixty schools and institutions overseas.
Gold: how many schools and institutions does the church operate overseas?
$G2S_{sta}$ w/o BiGGNN (Seq2Seq): how many schools does the church have?
$G2S_{sta}$ w/o DAN.: how many schools does the church have?
$G2S_{sta}$: how many schools and institutions does the church have?
$G2S_{sta}$+BERT: how many schools and institutions does the church have?
$G2S_{sta}$+BERT+RL: how many schools and institutions does the church operate?
$G2S_{dyn}$+BERT+RL: how many schools does the church operate?

*FIG. 8*

| Methods | BLEU-4 | Methods | BLEU-4 |
|---|---|---|---|
| $G2S_{dyn}$+BERT+RL | 18.06 | $G2S_{dyn}$ w/o feat | 16.51 |
| $G2S_{sta}$+BERT+RL | 18.30 | $G2S_{sta}$ w/o feat | 16.65 |
| $G2S_{sta}$+BERT-fixed+RL | 18.20 | $G2S_{dyn}$ w/o DAN | 12.58 |
| $G2S_{dyn}$+BERT | 17.56 | $G2S_{sta}$ w/o DAN | 12.62 |
| $G2S_{sta}$+BERT | 18.02 | $G2S_{sta}$ w/ DAN-word only | 15.92 |
| $G2S_{sta}$+BERT-fixed | 17.86 | $G2S_{sta}$ w/ DAN-hidden only | 16.07 |
| $G2S_{dyn}$+RL | 17.18 | $G2S_{sta}$ w/ GGNN-forward | 16.53 |
| $G2S_{sta}$+RL | 17.49 | $G2S_{sta}$ w/ GGNN-backward | 16.75 |
| $G2S_{dyn}$ | 16.81 | $G2S_{sta}$ w/o BiGGNN, w/ Seq2Seq | 16.14 |
| $G2S_{sta}$ | 16.96 | $G2S_{sta}$ w/o BiGGNN, w/ GCN | 14.47 |

*FIG. 10*

NATURAL QUESTION GENERATION VIA REINFORCEMENT LEARNING BASED GRAPH-TO-SEQUENCE MODEL

CROSS-REFERENCE TO RELATED APPLICATIONS

This application claims the benefit of U.S. Provisional Application 62/956,488 filed Jan. 2, 2020, the complete disclosure of which is expressly incorporated by reference herein, in its entirety, for all purposes.

STATEMENT REGARDING PRIOR DISCLOSURES BY THE INVENTOR OR A JOINT INVENTOR

The following disclosure(s) are submitted under 35 U.S.C. 102(b)(1)(A):
Yu Chen, Lingfei Wu, Mohammed J. Zaki, Reinforcement Learning Based Graph-to-Sequence Model for Natural Question Generation, arXiv: 1908.04942, Version 1, 14 Aug. 2019.
Yu Chen, Lingfei Wu, Mohammed J. Zaki, Reinforcement Learning Based Graph-to-Sequence Model for Natural Question Generation, arXiv: 1908.04942, Version 2, 20 Dec. 2019.
Yu Chen, Lingfei Wu, Mohammed J. Zaki, Reinforcement Learning Based Graph-to-Sequence Model for Natural Question Generation, arXiv: 1908.04942, Version 3, 16 Feb. 2020.

BACKGROUND

The present invention relates to the electrical, electronic and computer arts, and more specifically, to machine learning systems and the like.

Natural question generation (QG) is a challenging yet rewarding task, that aims to generate questions given an input passage and a target answer. Applications include, for example, reading comprehension, question answering, dialog systems, information technology (IT) support, and the like.

Known solutions typically do not consider global interactions between answer and context; fail to consider the rich hidden structural information of the word sequence; and/or are subject to limitations of cross-entropy based objectives.

SUMMARY

Principles of the invention provide techniques for natural question generation via reinforcement learning based graph-to-sequence model. In one aspect, an exemplary method includes the step of for a passage text and a corresponding answer text, performing a word-level soft alignment to obtain contextualized passage embeddings and contextualized answer embeddings; performing a hidden level soft alignment on the contextualized passage embeddings and the contextualized answer embeddings to obtain a passage embedding matrix; constructing a passage graph of the passage text based on the passage embedding matrix; and applying a bidirectional gated graph neural network to the passage graph until a final state embedding is determined, during which application intermediate node embeddings are fused from both incoming and outgoing edges of the graph. Further steps include obtaining a graph-level embedding from the final state embedding; decoding the final state embedding to generate an output sequence word-by-word; and training a machine learning model to generate at least one question corresponding to the passage text and the answer text, by evaluating the output sequence with a hybrid evaluator combining cross-entropy evaluation and reinforcement learning evaluation.

In another aspect, an exemplary apparatus includes a memory; a non-transitory computer readable medium including computer executable instructions; and at least one processor, coupled to the memory and the non-transitory computer readable medium, and operative to execute the instructions to be operative to instantiate a deep alignment network, a graph encoder including a bidirectional gated graph neural network, a decoder, and a hybrid evaluator; with the deep alignment network, for a passage text and a corresponding answer text, perform a word-level soft alignment to obtain contextualized passage embeddings and contextualized answer embeddings; and, with the deep alignment network, perform a hidden level soft alignment on the contextualized passage embeddings and the contextualized answer embeddings to obtain a passage embedding matrix. The at least one processor is further operative to, with the graph encoder, construct a passage graph of the passage text based on the passage embedding matrix; apply the bidirectional gated graph neural network to the passage graph until a final state embedding is determined, during which application intermediate node embeddings are fused from both incoming and outgoing edges of the graph; with the graph encoder, obtain a graph-level embedding from the final state embedding; with the decoder, decode the final state embedding to generate an output sequence word-by-word; and train a machine learning model to generate at least one question corresponding to the passage text and the answer text, by evaluating the output sequence with the hybrid evaluator combining cross-entropy evaluation and reinforcement learning evaluation.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide a reinforcement learning (RL) based graph-to-sequence (Graph2Seq) model for QG as well as deep alignment networks to effectively cope with the QG task, which overcomes limitations of existing approaches, such as (i) ignoring the rich structure information hidden in text, (ii) solely relying on cross-entropy loss that leads to issues like exposure bias and inconsistency between train/test measurement, and (iii) failing to fully exploit the answer information.

These and other features and advantages of the present invention will become apparent from the following detailed description of illustrative embodiments thereof, which is to be read in connection with the accompanying drawings.

BRIEF DESCRIPTION OF THE DRAWINGS

FIG. 5 is a table of automatic evaluation results on the SQuAD test set, according to an aspect of the invention;

FIG. 6 is a table of human evaluation results (+/−standard deviation) on the SQuAD split-2 test set, wherein the rating scale is from 1 to 5 (higher scores indicate better results), according to an aspect of the invention;

FIG. 7 is a table showing results for an ablation study on the SQuAD split-2 test set, according to an aspect of the invention;

FIG. 8 is a table showing generated questions on SQuAD split-2 test set, with target answers underlined, according to an aspect of the invention;

FIG. 10 is a table showing additional results for an ablation study on the SQuAD split-2 test set, according to an aspect of the invention.

DETAILED DESCRIPTION

Figure 1:
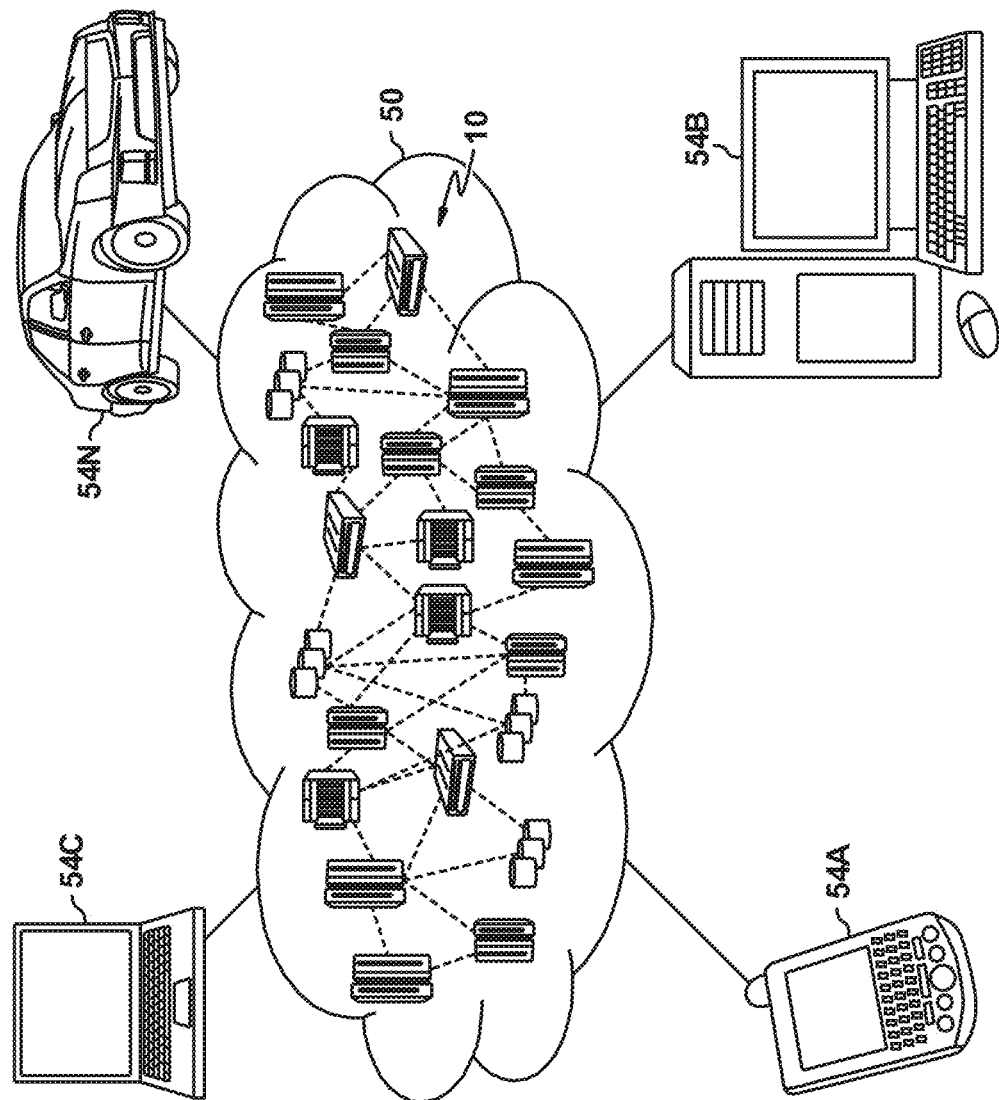
FIG. 1 depicts a cloud computing environment according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
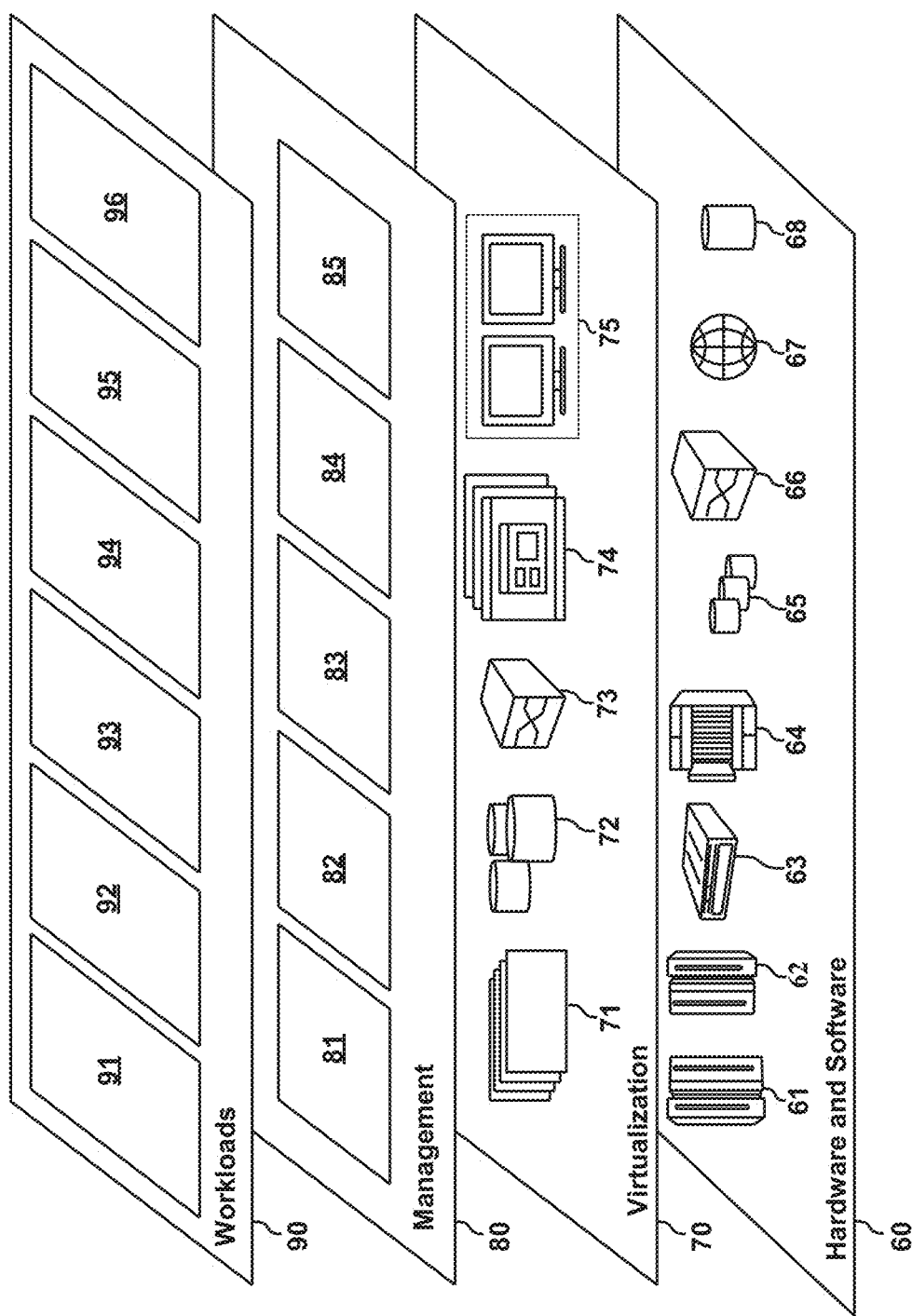
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a cloud-based service 96 for natural question generation via reinforcement learning based graph-to-sequence model, it being understood that cloud, non-cloud, and combined approaches could be employed.

One or more embodiments provide a method and system for natural question generation via a reinforcement learning based graph-to-sequence model. Question generation is an important task in the field of natural language processing. Natural question generation (QG) is a challenging yet rewarding task, which aims to generate questions given an input passage and a target answer. Exemplary applications include reading comprehension, question answering, dialog systems, information technology (IT) support, and the like.

Heretofore, current systems have failed to consider global interactions between answer and context; one or more embodiments, in contrast, provide a deep alignment network to align answer and context. Furthermore, current systems have generally failed to consider rich hidden structural information of word sequences; one or more embodiments, in contrast, provide a novel Graph2Seq model for considering hidden structural information in sequence. Even further, current systems have limitations as to cross-entropy based objectives; one or more embodiments, in contrast, provide a novel Reinforcement Learning Loss for enforcing syntactic and semantic coherence of generated text.

Advantageously, one or more embodiments do not rely on "hand-crafted" rules or features. One or more embodiments provide an effective Deep Alignment Network for explicitly modeling answer information. One or more embodiments apply Graph Neural Networks (GNNs) to extend Seq2Seq architecture to Graph2Seq architecture.

One or more embodiments provide a novel reinforcement learning based Graph-to-Sequence model for natural question generation. Aspects include a novel Reinforcement Learning (RL) based Graph2Seq model for natural question generation, as well as a two-stage training strategy to train the model with both cross-entropy and RL losses. A number of different ways of constructing passage graphs are disclosed herein and their performance impact on a Graph Neural Network (GNN)-based encoder is considered. One or more embodiments provide a simple yet effective Deep Alignment Network for explicitly modeling answer information.

Figure 3:
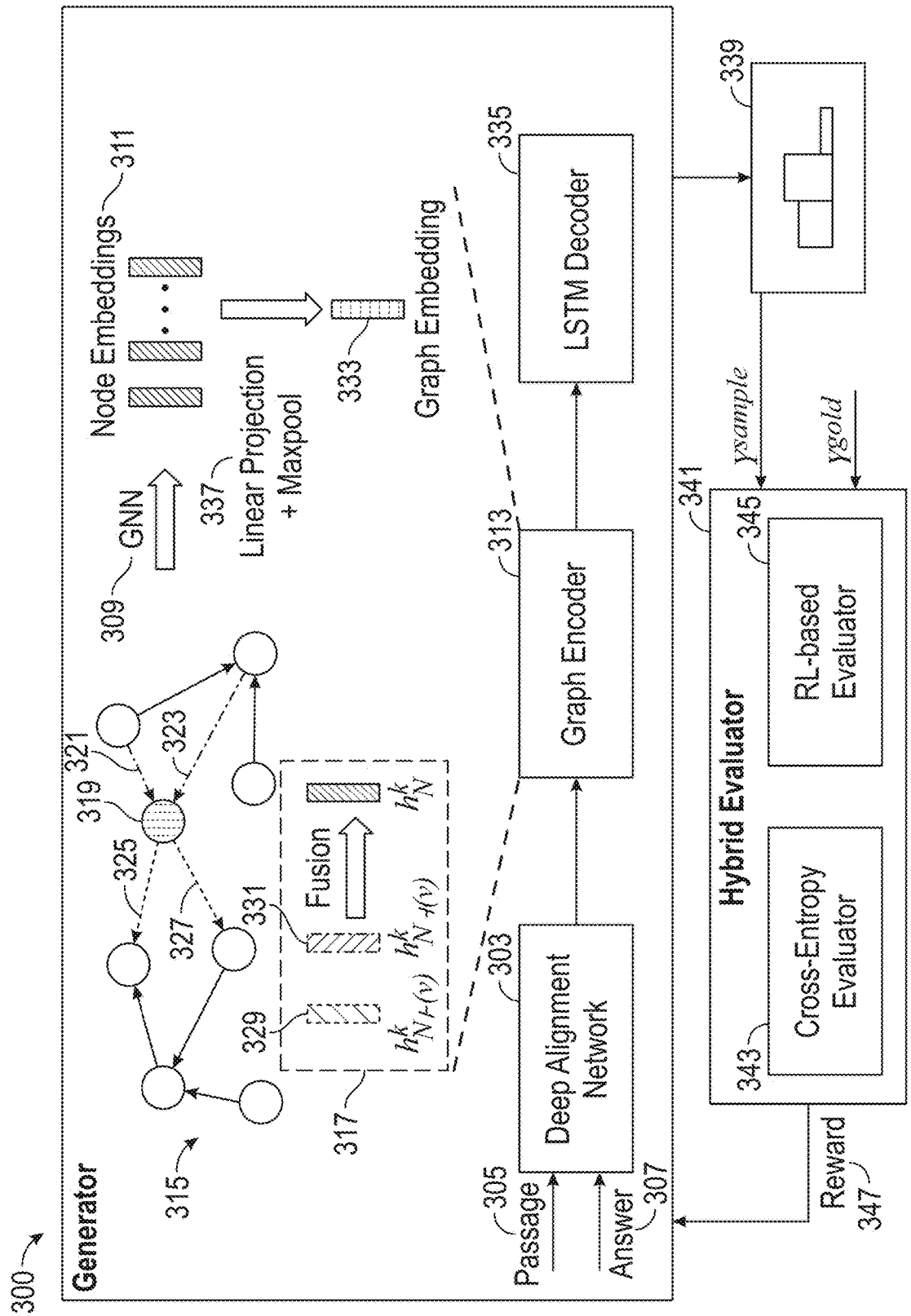
FIG. 3 is a block diagram of an exemplary system, according to an aspect of the invention.

Reference should now be had to FIG. 3, which depicts a system 300 in accordance with an aspect of the invention. Inputs to deep alignment network 303 include a passage 305 and answer 307. Passage 305 can include, for example, a paragraph of a document, or other sequence of text. The answer 307 can include, for example, a few words or a phrase; in general, a short text sequence. The goal of one or more embodiments is to generate a question that relates to the passage and the answer. For example, in the field of reading comprehension, a subject will read a passage and then be given a series of questions about it. Based on the questions, the subject can examine the passage to determine the answer(s). Here, in contrast, a passage and answers are available, and it is desired to generate questions that correspond to the answers. Deep alignment network 303 deeply explores the relationship between the passage and the answer, so that the neural network (e.g. graph neural network (GNN) 309) can capture the deep interactions between them. Then, pass the node embeddings 311 that worked for each passage to graph encoder 313.

Graph encoder 313 takes, as input, a suitable graph 315. Each h at 317 includes a node embedding 311 of graph 315. In GNN 309, to carry out embeddings, aggregate the neighborhood node embeddings information to learn the context so that the embeddings can be learned. When learning embeddings, consider both incoming edges and outgoing edges. For example, for node 319, the incoming edges are 321, 323, and the outgoing edges are 325, 327. Incoming edges and outgoing edges have different types of information, which should be fused, as at 317. Bar 329 represents the outgoing edges and bar 331 represents the incoming edges. For each node 319, fuse the incoming and outgoing edges 329, 331 to obtain a corresponding one of the node embeddings 311 for that node. Once the node embeddings 311 are available, there are, for example, two ways to construct graph 315. One way is to use a static graph based on a tree structure including word sequences. The tree is then an input to the graph encoder 313. Another way is Semantics-aware dynamic graph construction. Each graph node will have a node embedding 311. Graph (label) embedding 333, in essence, summarizes the whole graph; it can be obtained from the node embeddings 311 using linear projection and Maxpool, as at 337.

The output of encoder 313 is then taken as the input to LSTM decoder 335. Decoder 335 decodes the input into a text sequence 339 (the desired question corresponding to the passage and answer 305, 307). $Y^{sample}$ represents one instance; each decoded sequence is compared to the "golden" sequence $Y^{gold}$. Comparison can be carried out, for example, with hybrid evaluator 341, which includes cross-entropy evaluator 343 and RL-based evaluator 345. The output of evaluator 341 is a reward 347 to compute the final loss. This is provided back to the deep alignment network 303 and training continues until convergence. Once training is complete, the trained model is used to generate high-quality questions, given passages and answers.

Deep alignment network 303 can be implemented, for example, by word-level answer alignment and hidden representation-level answer alignment. In word-level answer alignment, first carry out soft-alignment at the word-level, based on the GloVe (Global Vectors for Word Representation) embeddings of the passage and the answer, to obtain aligned answer embeddings. Encode each passage word with GloVe embedding, BERT (Bidirectional Encoder Representations from Transformers) embedding, aligned answer embedding and linguistic feature(s) (e.g., case, Part-of-Speech (POS) and Named Entity Recognition (NER)). Encode each answer word with GloVe embedding and BERT embedding. Apply two BiLSTMs (Bidirectional long short-term memories) to the encoded passage and answer, respectively. In hidden representation-level answer alignment, carry out soft-alignment at the contextualized hidden representation level based on the contextualized passage and answer embeddings to obtain aligned answer embeddings. Apply a BiLSTM to the concatenation of the contextualized passage embeddings and the above aligned answer embeddings.

Graph encoder 313 can be implemented, for example, via graph construction and using bidirectional gated graph neural networks. In graph construction, construct a passage graph which includes each passage word as a node. Different ways of constructing a passage graph include syntax-based static graph construction and semantic-aware dynamic graph construction. One or more embodiments use a bidirectional gated graph neural network (BiGGNN) to encode the directed passage graph. Compute the graph-level representation, for example, by applying linear projection and max pooling to the updated node embeddings.

Decoder 335 includes, for example, a state-of-the-art RNN-based decoder, with an attention-based LSTM model, copy mechanism, and coverage mechanism. This results in an improved loss function.

Hybrid evaluator 341 combines, for example, both cross-entropy evaluator 343 and RL-based evaluator 345. In the first stage, train the model using regular cross-entropy loss. In the second stage, fine-tune the model by optimizing a mixed objective function combing both cross-entropy loss and reinforcement loss which is defined on the evaluation metric (e.g., BLEU (Bilingual Evaluation Understudy) score).

One or more embodiments accordingly provide a method and system for performing natural question generation by learning a novel RL based Graph2Seq model, including a Deep Alignment Network 303 that carries out word-level answer alignment and hidden representation-level answer alignment; a Graph Encoder 313 that constructs a passage graph, applies bidirectional gated graph neural networks to the passage graph, and computes the graph-level embedding; a Decoder 335 that applies an attention-based LSTM decoder with copy and coverage mechanisms; and a Hybrid evaluator 341 that combines both a cross-entropy evaluator and an RL-based evaluator to train the model.

One non-limiting practical application is a dialog system for IT support. For example, consider a virtual assistant for answering user questions. Question and answer pairs are not always available. One might extract the key points from the user manual for a laptop computer; these key points are identified as answers. One example might be the procedure for installing a piece of application software. Using a system in accordance with an aspect of the invention, generate the questions that correspond to that answer. Then, when an actual user asks that question, the system provides the relevant passage in answer thereto. Generally, embodiments of the invention can be applied, for example, to a "how to" manual to generate likely questions anticipated from users, and to identify the corresponding portions of the manual that constitute the answers. For example, provide a cloud service for network users, identify questions in network documentation using embodiments of the invention, and respond to actual users asking those questions. The network could be fixed/reconfigured in accordance with the identified answer(s), for example.

As noted, natural question generation (QG) aims to generate questions from a passage and an answer. Previous works on QG: (i) ignore the rich structure information hidden in text, (ii) solely rely on cross-entropy loss that leads to issues such as exposure bias and inconsistency between train/test measurement, and/or (iii) fail to fully exploit the answer information. To address these limitations, one or more embodiments provide a reinforcement learning (RL) based graph-to-sequence (Graph2Seq) model for QG. One or more embodiments include a Graph2Seq generator with a novel Bidirectional Gated Graph Neural Network-based encoder to embed the passage, and a hybrid evaluator with a mixed objective function that combines both the cross-entropy and RL loss to ensure the generation of syntactically and semantically valid text. One or more embodiments provide an effective Deep Alignment Network for incorporating the answer information into the passage at both the word and contextual level. One or more embodiments are end-to-end trainable and outperform existing methods by a significant margin on the standard SQuAD benchmark for QG.

Natural question generation (QG) has many useful applications such as improving the question answering task by providing more training data, generating practice exercises and assessments for educational purposes, and helping dialog systems to kick-start and continue a conversation with human users. While many existing works focus on QG from images or knowledge bases, one or more embodiments are advantageously capable of QG from text.

Conventional methods for QG rely on heuristic rules or hand-crafted templates, leading to the issues of low generalizability and scalability. Recent attempts have been focused on exploiting Neural Network (NN) based approaches that do not require manually-designed rules and are end-to-end trainable. Encouraged by the huge success of neural machine translation, these approaches formulate the QG task as a sequence-to-sequence (Seq2Seq) learning problem. Specifically, attention-based Seq2Seq models and their enhanced versions with copy and coverage mechanisms have been widely applied and show promising results on this task. However, these methods typically ignore the hidden structural information associated with a word sequence such as the syntactic parsing tree. Failing to utilize the rich text structure information beyond the simple word sequence may limit the effectiveness of these models for QG.

It has been observed that in general, cross-entropy based sequence training has several limitations such as exposure bias and inconsistency between train/test measurement. As a result, such training does not always produce the best results on discrete evaluation metrics on sequence generation tasks such as text summarization or question generation. To cope with these issues, some recent QG approaches directly optimize evaluation metrics using Reinforcement Learning (RL). However, existing approaches usually only employ evaluation metrics such as BLEU and ROUGE-L as rewards for RL optimization. More importantly, they do not exploit other important metrics such as syntactic and semantic constraints for guiding high-quality text generation.

Early works on neural QG did not take into account the answer information when generating a question. Recent works have started to explore various means of utilizing the answer information. When question generation is guided by the semantics of an answer, the resulting questions become more relevant and readable. Conceptually, there are three different ways to incorporate the answer information by simply marking the answer location in the passage, using complex passage-answer matching strategies, or separating answers from passages when applying a Seq2Seq model. However, they neglect potential semantic relations between passage words and answer words, and thus do not explicitly model the global interactions among them in the embedding space.

To address these aforementioned issues, one or more embodiments provide a novel reinforcement learning based generator-evaluator architecture that: i) makes full use of rich hidden structure information beyond the simple word sequence; ii) generates syntactically and semantically valid text while maintaining the consistency of train/test measurement; and/or iii) models explicitly the global interactions of semantic relationships between passage and answer at both word-level and contextual-level. In particular, to achieve the first goal, one or more embodiments construct a syntax-based static graph and/or a semantics-aware dynamic graph from the text sequence, as well as its rich hidden structure information. One or more embodiments provide a graph-to-sequence (Graph2Seq) model based generator that encodes the graph representation of a text passage and decodes a question sequence using a Recurrent Neural Network (RNN). An inventive Graph2Seq model is based on a novel bidirectional gated graph neural network, which extends the original gated graph neural network by considering both incoming and outgoing edges, and fusing them during the graph embedding learning. To achieve the second goal, one or more embodiments provide a hybrid evaluator which is trained by optimizing a mixed objective function that combines both cross-entropy and RL loss. One or more embodiments use not only discrete evaluation metrics such as BLEU, but also semantic metrics such as word mover's distance to encourage both syntactically and semantically valid text generation. To achieve the third goal, one or more embodiments employ a novel Deep Alignment Network (DAN) for effectively incorporating answer information into the passage at multiple granularity levels.

One or more embodiments provide a novel RL-based Graph2Seq model for natural question generation, introducing the Graph2Seq architecture for QG. One or more embodiments provide static and/or dynamic ways of constructing a graph from text and enabling their effective performance impacts on a GNN encoder. In one or more embodiments, an inventive model is end-to-end trainable, achieves new state-of-the-art scores, and outperforms existing methods by a significant margin on the standard SQuAD benchmark for QG. Experiments demonstrate that the questions generated by one or more embodiments are more natural (semantically and syntactically) compared to other baselines.

RL-based generator-evaluator architecture: The question generation task is now defined, and an exemplary inventive RL-based Graph2Seq model for question generation is disclosed. The goal of question generation is to generate natural language questions based on a given form of data, such as knowledge base triples or tables, sentences, or images, where the generated questions need to be answerable from the input data. One or more embodiments focus on QG from a given text passage, along with a target answer.

Assume that a text passage is a collection of word tokens $X^p=\{x_1^p, x_2^p, \ldots, x_N^p\}$, and a target answer is also a collection of word tokens $X^a=\{x_1^a, x_2^a, \ldots, x_L^a\}$. The task of natural question generation is to generate the best natural language question consisting of a sequence of word tokens $\hat{Y}=\{y_1, y_2, \ldots, y_T\}$ which maximizes the conditional likelihood $\hat{Y}=\arg\max_Y P(Y|X^p, X^a)$. Here N, L, and T are the lengths of the passage, answer, and question, respectively. One or more embodiments address the problem setting where there are a set of passage (and answers) and target questions pairs, to learn the mapping; existing QG approaches make a similar assumption. In one or more embodiments, when training the model, feed in a plurality of passage-question pairs, as well as the associated answers; the system learns the mappings from the passages to the questions, given the data.

Deep Alignment Network: Regarding network 303, answer information is pertinent for generating relevant and high quality questions from a passage. Unlike previous methods that neglect potential semantic relations between passage and answer words, one or more embodiments explicitly model the global interactions among them in the embedding space. To this end, one or more instances provide a novel Deep Alignment Network (DAN) component 303 for effectively incorporating answer information into the passage with multiple granularity levels. Specifically, one or more embodiments perform attention-based soft-alignment at the word level, as well as at the contextualized hidden state level, so that multiple levels of alignments can help learn hierarchical representations.

Figure 4:
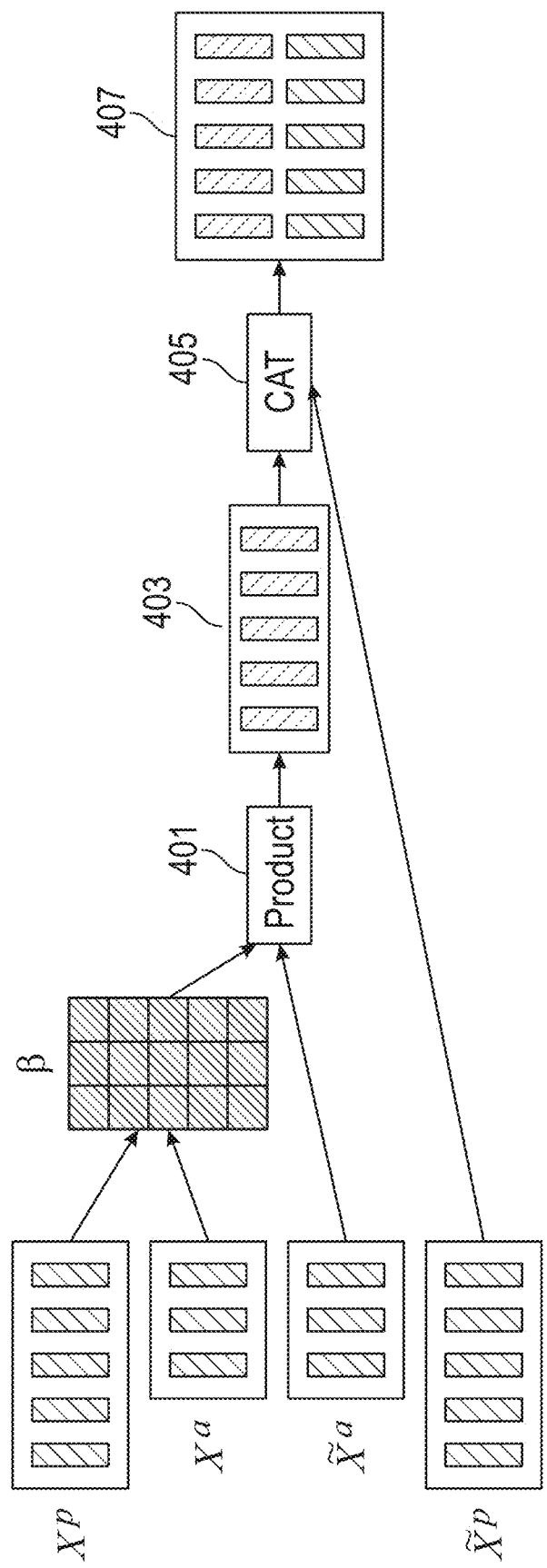
FIG. 4 shows an attention-based soft-alignment mechanism, according to an aspect of the invention.

Referring to FIG. 4, Let $X^p \in \mathbb{R}^{F \times N}$ and $\tilde{X}^p \in \mathbb{R}^{\tilde{F}_p \times N}$ denote two embeddings associated with passage text. Similarly, let $X^a \in \mathbb{R}^{F \times L}$ and $\tilde{X}^a \in \mathbb{R}^{\tilde{F}_a \times L}$ denote two embeddings associated with answer text. Conceptually, as shown in FIG. 4, the soft alignment mechanism includes three steps: i) compute the attention score $\beta_{i,j}$ for each pair of passage word $x_i^p$ and answer word $x_j^a$; ii) multiply, as at 401, the attention matrix $\beta$ with the answer embeddings $\tilde{X}^a$ to obtain the aligned answer embeddings $H^p$ 403 for the passage; and iii) concatenate, as at 405, the resulting aligned answer embeddings $H^p$ with the passage embeddings $\tilde{X}^p$ to obtain the final passage embeddings 407, $\tilde{H}^p \in \mathbb{R}^{(\tilde{F}_p + \tilde{F}_a) \times N}$.

The soft-alignment function is defined as follows:

$$\tilde{H}^p = \text{Align}(X^p, X^a, \tilde{X}^p, \tilde{X}^a) = \text{CAT}(\tilde{X}^p; H^p) = \text{CAT}(\tilde{X}^p; \tilde{X}^a \beta^T) \quad (1)$$

In the above, the matrix $\tilde{H}^p$ is the final passage embedding, the function CAT is a simple concatenation operation, and $\beta$ is an N×L attention score matrix, computed by:

$$\beta \propto \exp(\text{ReLU}(WX^p)^T \text{ReLU}(WX^a)) \quad (2)$$

In the above, $W \in \mathbb{R}^{d \times F}$ is a trainable weight matrix, with d being the hidden state size and ReLU is the rectified linear unit. After introducing the general soft-alignment mechanism, next consider how to undertake soft-alignment at both the word-level and the contextualized hidden state level.

Word-Level Alignment: In the word-level alignment stage, first perform a soft-alignment between the passage and the answer based only on their pretrained GloVe embeddings and compute the final passage embeddings by $\tilde{H}^p = \text{Align}(G^p, G^a, [G^p; B^p; L^p], G^a)$, where $G^p$, $B^p$, and $L^p$ are the corresponding GloVe embedding, BERT embedding, and linguistic feature (i.e., case, NER and POS) embedding of the passage text, respectively. Then a bidirectional LSTM is applied to the final passage embeddings $\tilde{H}^p = \{\tilde{h}_i^p\}_{i=1}^N$ to obtain contextualized passage embeddings $\overline{H}^p \in \mathbb{R}^{F \times N}$.

On the other hand, for the answer text $X^a$, simply concatenate its GloVe embedding $G^a$ and its BERT embedding $B^a$ to obtain its word embedding matrix $H^a \in \mathbb{R}^{d' \times L}$. Another BiLSTM is then applied to the concatenated answer embedding sequence to obtain the contextualized answer embeddings $\overline{H}^a \in \mathbb{R}^{F \times L}$.

Hidden-Level Alignment: In the hidden-level alignment stage, perform another soft-alignment based on the contextualized passage and answer embeddings. Similarly, compute the aligned answer embedding, and concatenate it with the contextualized passage embedding to obtain the final passage embedding matrix $\text{Align}([G^p; B^p; \tilde{H}^p], [G^a; B^a; \overline{H}^a], \overline{H}^p, \overline{H}^a)$ Finally, apply another BiLSTM to the above concatenated embedding to obtain an F×N passage embedding matrix X.

Bidirectional Graph-To-Sequence Generator: While RNNs are good at capturing local dependencies among consecutive words in text, GNNs 309 have been shown to better utilize the rich hidden text structure information such as syntactic parsing or semantic parsing, and can model the global interactions (relations) among sequence words to further improve the representations. Therefore, unlike most of the existing methods that rely on RNNs to encode the input passage, one or more embodiments first construct a passage graph G from text where each passage word is treated as a graph node (e.g. 319 in graph 315), and then employ a novel Graph2Seq model to encode the passage graph (and answer), and to decode the natural language question.

Passage Graph Construction: Existing GNNs assume a graph structured input and directly consume it for computing the corresponding node embeddings. However, one or more embodiments construct a graph from the text. Although there are early attempts on constructing a graph from a sentence, there is no clear answer as to the best way of representing text as a graph. One or more embodiments employ static and/or dynamic graph construction approaches, exemplary performance differences between these two methods are discussed elsewhere herein with regard to experiments.

Syntax-based static graph construction: Construct a directed and unweighted passage graph based on dependency parsing. For each sentence in a passage, first obtain its dependency parse tree. Then, connect neighboring dependency parse trees by connecting those nodes that are at a sentence boundary and next to each other in text.

Semantics-aware dynamic graph construction: Dynamically build a directed and weighted graph to model semantic relationships among passage words. One or more embodiments make the process of building such a graph depend on not only the passage, but also on the answer. The graph construction procedure includes three steps: i) compute a dense adjacency matrix A for the passage graph by applying self-attention to the word-level passage embeddings $\tilde{H}_p$, ii) a kNN-style graph sparsification strategy is adopted to obtain a sparse adjacency matrix $\overline{A}$, where only the K nearest neighbors (including itself) are kept as well as the associated attention scores (i.e., the remaining attention scores are masked off) for each node; and iii) based on BiLSTM over LSTM, also compute two normalized adjacency matrices $A^{\dashv}$ and $A^{\vdash}$ according to their incoming and outgoing directions, by applying the softmax operation on the resulting sparse adjacency matrix $\overline{A}$ and its transpose, respectively. Thus:

$$A = \text{ReLU}(U\tilde{H}^p)^T \text{ReLU}(U\tilde{H}^p), \overline{A} = kNN(A),$$
$$A^{\dashv}, A^{\vdash} = \text{softmax}(\{\overline{A}, \overline{A}^T\}) \quad (3)$$

where U is $d \times (\tilde{F}_p + \tilde{F}_a)$ trainable weight matrix. Note that the supervision signal is able to back-propagate through the kNN-style graph sparsification operation since the K nearest attention scores are kept.

Bidirectional Gated Graph Neural Networks: To effectively learn the graph embeddings from the constructed text graph, one or more embodiments employ a novel Bidirectional Gated Graph Neural Network (BiGGNN) which extends Gated Graph Sequence Neural Networks by learning node embeddings from both incoming 321, 323 and outgoing 325, 327 edges in an interleaved fashion when processing the directed passage graph. A similar idea has also been exploited by extending another popular variant of GNNs-GraphSAGE. However, one pertinent distinction between BiGGNN as disclosed herein and the prior-art bidirectional GraphSAGE is that one or more embodiments fuse the intermediate node embeddings from both incoming and outgoing edges in every iteration during the training, whereas the prior art model simply trains the node embeddings of each direction independently and concatenates them in the final step.

In BiGGNN, node embeddings are initialized to the passage embeddings X returned by DAN. The same set of network parameters are shared at every hop of computation. At each computation hop, for every node in the graph, apply an aggregation function which takes as input a set of incoming (or outgoing) neighboring node vectors and outputs a backward (or forward) aggregation vector. For the syntax-based static graph, use a mean aggregator for simplicity although other operators such as max or attention could also be employed:

$$h^k_{\mathcal{N}_{\dashv(v)}} = \text{MEAN}(\{h_v^{k-1}\} \cup \{h_u^{k-1}, \forall u \in \mathcal{N}_{\dashv(v)}\})$$

$$h^k_{\mathcal{N}_{\vdash(v)}} = \text{MEAN}(\{h_v^{k-1}\} \cup \{h_u^{k-1}, \forall u \in \mathcal{N}_{\vdash(v)}\}) \quad (4)$$

For the semantics-aware dynamic graph, compute a weighted average for aggregation where the weights come from the normalized adjacency matrices $A^{\dashv}$ and $A^{\vdash}$, defined as:

$$h^K_{\mathcal{N}_{\dashv(v)}} = \sum_{\forall u \in \mathcal{N}_{\dashv(v)}} a^{\dashv}_{v,u} h_u^{k-1},$$

$$h^K_{\mathcal{N}_{\vdash(v)}} = \sum_{\forall u \in \mathcal{N}_{\vdash(v)}} a^{\vdash}_{v,u} h_u^{k-1} \quad (5)$$

While some prior art techniques learn separate node embeddings for both directions independently, one or more embodiments fuse the information aggregated in the two directions at each hop, which we have found works better in general (see 317):

$$h^k_{\mathcal{N}} = \text{Fuse}(h^k_{\mathcal{N}_{\dashv(v)}}, h^k_{\mathcal{N}_{\vdash(v)}}) \quad (6)$$

One or more embodiments employ a fusion function as a gated sum of two information sources:

$$\text{Fuse}(a,b) = z \odot a + (1-z) \odot b, \; z = \sigma(W_z[a;b;a\odot b;a-b]+b_z) \quad (7)$$

In the above, $\odot$ is the component-wise multiplication, $\sigma$ is a sigmoid function, and z is a gating vector.

Finally, a Gated Recurrent Unit (GRU) is used to update the node embeddings by incorporating the aggregation information:

$$h_v^k = \text{GRU}(h_v^{k-1}, h^k_{\mathcal{N}}) \quad (8)$$

After n hops of GNN computation, where n is a hyperparameter, obtain the final state embedding $h_v^n$ for node v. As seen at 337, to compute the graph-level embedding, first apply a linear projection to the node embeddings, and then apply max-pooling over all node embeddings to get, at 333, a d-dim vector $h^G$.

RNN Decoder: On the decoder side, one or more embodiments adopt the same model architecture as other state-of-the-art Seq2Seq models where an attention-based LSTM decoder 335 with copy and coverage mechanisms is employed. The decoder takes the graph-level embedding $h^G$ followed by two separate fully-connected layers as initial hidden states (i.e., $c_0$ and $s_0$) and the node embeddings $\{h_v^n, \forall v \in \mathcal{G}\}$ as the attention memory, and generates the output sequence one word at a time. Further details are provided elsewhere herein.

Hybrid Evaluator: Regarding 341, it has been observed that optimizing such cross-entropy based training objectives for sequence learning does not always produce the best results on discrete evaluation metrics. Limitations of this strategy include exposure bias and evaluation discrepancy between training and testing. To tackle these issues, some recent QG approaches directly optimize evaluation metrics using REINFORCE. One or more embodiments further employ a mixed objective function with both syntactic and semantic constraints for guiding text generation. In particular, one or more embodiments provide a hybrid evaluator with a mixed objective function that combines both cross-entropy loss 343 and RL loss 345 in order to ensure the generation of syntactically and semantically valid text.

For the RL part 345, one or more embodiments employ the self-critical sequence training (SCST) algorithm to directly optimize the evaluation metrics. SCST is an efficient REINFORCE algorithm that utilizes the output of its own test-time inference algorithm to normalize the rewards it experiences. In SCST, at each training iteration, the model generates two output sequences: the sampled output $Y^s$, produced by multinomial sampling, that is, each word $y_t^s$ is sampled according to the likelihood $P(y_t|X,y<t)$ predicted by the generator, and the baseline output $\hat{Y}$, obtained by greedy search, that is, by maximizing the output probability distribution at each decoding step. Define r(Y) as the reward of an output sequence Y, computed by comparing it to corresponding ground-truth sequence Y* with some reward metrics. The loss function is defined as:

$$\mathcal{L}_{rl} = (r(\hat{Y}) - r(Y^s)) \sum_t \log P(y_t^s | X, y^s_{<t}) \quad (9)$$

As can be seen, if the sampled output has a higher reward than the baseline one, maximize its likelihood, and vice versa.

One pertinent factor for RL is to pick the proper reward function. To take syntactic and semantic constraints into account, consider the following metrics as reward functions:

Evaluation metric as reward function: use one of the evaluation metrics, BLEU-4, as reward function $f_{eval}$, which permits directly optimizing the model towards the evaluation metrics.

Semantic metric as reward function: One drawback of some evaluation metrics like BLEU is that they do not measure meaning, but only reward systems for n-grams that have exact matches in the reference system. To make the reward function more effective and robust, one or more embodiments additionally use word movers distance (WMD) as a semantic reward function $f_{sem}$. WMD is a state-of-the-art approach to measure the dissimilarity between two sentences based on word. One or more embodiments take the negative of the WMD distance between a generated sequence and the ground-truth sequence and divide it by the sequence length as its semantic score.

The final reward function 347 is defined as:

$$r(Y) = f_{eval}(Y, Y^*) + \alpha f_{sem}(Y, Y^*)$$

where $\alpha$ is a scalar.

Training and Testing: one or more embodiments train the model in two stages. In the first state, train the model using regular cross-entropy loss, defined as:

$$\mathcal{L}_{lm} = \sum_t -\log P(y_t^* | X, y^*_{<t}) + \lambda covloss_t \quad (10)$$

In the above, $y_t^*$ is the word at the t-th position of the ground-truth output sequence and $covloss_t$ is the coverage loss defined as $\Sigma_i \min(a_i^t, c_i^t)$, with $a_i^t$ being the i-th element of the attention vector over the input sequence at time step t. Scheduled teacher forcing is adopted to alleviate the exposure bias problem. In the second stage, fine-tune the model by optimizing a mixed objective function combining both cross-entropy loss and RL loss, defined as:

$$\mathcal{L} = \gamma \mathcal{L}_{rl} + (1-\gamma) \mathcal{L}_{lm} \quad (11)$$

In the above, γ is a scaling factor controlling the trade-off between cross-entropy loss and RL loss. During the testing phase, use beam search to generate final predictions.

Experimental results: An exemplary inventive model was evaluated against state-of-the-art methods on the SQuAD dataset. Exemplary full models have two variants, namely, $G2S_{sta}$+BERT+RL and $G2S_{dyn}$+BERT+RL which adopt static graph construction or dynamic graph construction, respectively. Exemplary model settings and sensitivity analysis are presented elsewhere herein.

Baseline methods: Comparison was conducted against the following baselines: i) SeqCopyNet, ii) NQG++, iii) MPQG+R, iv) AFPQA, v) s2sa-at-mp-gsa, vi) ASs2s, and vii) CGC-QG.

Data and Metrics: SQuAD contains more than 100K questions posed by crowd workers on 536 Wikipedia articles. Since the test set of the original SQuAD is not publicly available, the accessible parts were used as the entire dataset in the experiments. For fair comparison with previous methods, an exemplary inventive model was evaluated on both data split-1 that contains 75,500/17,934/11,805 (train/development/test) examples and data split-2 that contains 86,635/8,965/8,964 examples.

BLEU-4, METEOR, ROUGE-L and Q-BLEU1 were employed as evaluation metrics. Initially, BLEU-4 and METEOR were designed for evaluating machine translation systems and ROUGE-L was designed for evaluating text summarization systems. Recently, Q-BLEU1 was designed for better evaluating question generation systems, which was shown to correlate significantly better with human judgments compared to existing metrics.

Besides automatic evaluation metrics, a human evaluation study was also conducted on split-2. Human evaluators were asked to rate generated questions from a set of anonymized competing systems based on whether they were syntactically correct, semantically correct, and relevant to the passage. The rating scale is from 1 to 5, on each of the three categories. Evaluation scores from all evaluators were collected and averaged as final scores. Further details are provided elsewhere herein.

The table of FIG. 5 shows the automatic evaluation results comparing exemplary models against other state-of-the-art baseline methods (automatic evaluation results on the SQuAD test set). It can be seen that both exemplary full models G2Ssta+BERT+RL and G2Sdyn+BERT+RL work well on both data splits and consistently outperform previous methods by a significant margin. This demonstrates that the RL-based Graph2Seq model, together with the deep alignment network, successfully addresses the three issues with prior-art techniques mentioned above. Between these two variants, G2Ssta+BERT+RL outperforms G2Sdyn+BERT+RL on all the metrics. Also, unlike the baseline methods, the exemplary model does not rely on any hand-crafted rules or ad-hoc strategies, and is fully end-to-end trainable.

The table of FIG. 6 shows human evaluation results (+/−standard deviation) on the SQuAD split-2 test set. The rating scale is from 1 to 5 (higher scores indicate better results). FIG. 6 presents a human evaluation study to assess the quality of the questions generated by an exemplary model, the baseline method MPQG+R, and the ground-truth data in terms of syntax, semantics and relevance metrics. It can be seen that the best performing model achieves good results even compared to the ground-truth, and outperforms the strong baseline method MPQG+R. Error analysis shows that main syntactic error occurs in repeated/unknown words in generated questions. Further, the slightly lower quality on semantics also impacts the relevance.

The table of FIG. 7 shows an ablation study on the SQuAD split-2 test set. As shown, an ablation study was performed to systematically assess the impact of different model components (e.g., BERT, RL, DAN, and BiGGNN) for two proposed full model variants (static vs dynamic) on the SQuAD split-2 test set. It confirms that syntax-based static graph construction (G2Ssta+BERT+RL) performs better than semantics-aware dynamic graph construction (G2Sdyn+BERT+RL) in almost every setting. An advantage of static graph construction is that useful domain knowledge can be hard-coded into the graph, which can greatly benefit the downstream task. However, it might suffer if there is a lack of prior knowledge for a specific domain knowledge. On the other hand, dynamic graph construction does not need any prior knowledge about the hidden structure of text, and only relies on the attention matrix to capture this structured information, which provides an easy way to achieve a decent performance.

By turning off the Deep Alignment Network (DAN), the BLEU-4 score of $G2S_{sta}$ (similarly for $G2S_{dyn}$) dramatically drops from 16.96% to 12.62%, which indicates the importance of answer information for QG and shows the effectiveness of DAN. This can also be verified by comparing the performance between the DAN-enhanced Seq2Seq model (16.14 BLEU-4 score) and other carefully designed answer-aware Seq2Seq baselines such as NQG++(13.29 BLEU-4 score), MPQG+R (14.71 BLEU-4 score) and AFPQA (15.82 BLEU-4 score). Further experiments demonstrate that both word-level ($G2S_{sta}$ w/DAN-word only) and hidden-level ($G2S_{sta}$ w/DAN-hidden only) answer alignments in DAN are helpful.

The advantages of Graph2Seq learning over Seq2Seq learning on this task by can be seen by comparing the performance between $G2S_{sta}$ and Seq2Seq. Compared to Seq2Seq based QG methods that completely ignore hidden structure information in the passage, an exemplary Graph2Seq based method is aware of more hidden structure information such as semantic similarity between any pair of words that are not directly connected or syntactic relationships between two words captured in a dependency parsing tree. In experiments, it was observed that that doing both forward and backward message passing in the GNN encoder is beneficial. It appears that using GCN as the graph encoder (and converting the input graph to an undirected graph) does not necessarily provide good performance. In addition, fine-tuning the model using REINFORCE can further improve the model performance in all settings (i.e., with and without BERT), which shows the benefits of directly optimizing the evaluation metrics. Besides, it was found that the pretrained BERT embedding has a considerable impact on the performance and fine-tuning BERT embedding even further improves the performance, which demonstrates the power of large-scale pretrained language models.

The table of FIG. 8 depicts generated questions on the SQuAD split-2 test set. Target answers are underlined. This table further show a few examples that illustrate the quality of generated text given a passage under different ablated systems. As can be seen, incorporating answer information helps the model identify the answer type of the question to be generated, and thus makes the generated questions more relevant and specific. Also, it was noted that an embodiment of the inventive Graph2Seq model can generate more complete and valid questions compared to the Seq2Seq baseline. It is believed that the Graph2Seq model is able to exploit the rich text structure information better than a Seq2Seq model. Lastly, note that fine-tuning the model using REINFORCE can improve the quality of the generated questions.

One or more embodiments thus provide a novel RL based Graph2Seq model for QG, where the answer information is utilized by an effective Deep Alignment Network and a novel bidirectional GNN is provided to process the directed passage graph. A two-stage training strategy benefits from both cross-entropy based and REINFORCE based sequence training. Static and/or dynamic graph construction from text are possible. On the benchmark SQuAD dataset, an exemplary embodiments outperforms previous state-of-the-art methods by a significant margin and achieves new best results.

Additional Details on the RNN Decoder: In one or more embodiments, at each decoding step t, an attention mechanism learns to attend to the most relevant words in the input sequence, and computes a context vector $h_t^*$ based on the current decoding state St, the current coverage vector $c^t$ and the attention memory. In addition, the generation probability $p_{gen} \in [0, 1]$ is calculated from the context vector $h_t^*$, the decoder state st and the decoder input $y_{t-1}$. Next, $p_{gen}$ is used as a soft switch to choose between generating a word from the vocabulary, or copying a word from the input sequence. One or more embodiments dynamically maintain an extended vocabulary which is the union of the usual vocabulary and all words appearing in a batch of source examples (i.e., passages and answers). Finally, in order to encourage the decoder to utilize the diverse components of the input sequence, a coverage mechanism is applied. At each step, maintain a coverage vector $c^t$, which is the sum of attention distributions over all previous decoder time steps. A coverage loss is also computed to penalize repeatedly attending to the same locations of the input sequence.

Additional details on model settings: One or more embodiments keep and fix the 300-dim GloVe vectors for the most frequent 70,000 words in the training set. Compute the 1024-dim BERT embeddings on the fly for each word in text using a (trainable) weighted sum of all BERT layer outputs. The embedding sizes of case, POS and NER tags are set to 3, 12 and 8, respectively. Set the hidden state size of BiLSTM to 150 so that the concatenated state size for both directions is 300. The size of all other hidden layers is set to 300. Apply a variational dropout rate of 0.4 after word embedding layers and 0.3 after RNN layers. Set the neighborhood size to 10 for dynamic graph construction. The number of GNN hops is set to 3. During training, in each epoch, set the initial teacher forcing probability to 0.75 and exponentially increase it to 0.75*0.9999$^i$ where i is the training step. Set α in the reward function to 0.1, γ in the mixed loss function to 0.99, and the coverage loss ratio λ to 0.4. Use Adam (known to the skilled artisan) as the optimizer, and the learning rate is set to 0.001 in the pretraining stage and 0.00001 in the fine-tuning stage. Reduce the learning rate by a factor of 0.5 if the validation BLEU-4 score stops improving for three epochs. Stop the training when no improvement is seen for 10 epochs. Clip the gradient at length 10. The batch size is set to 60 and 50 on data split-1 and split-2, respectively. The beam search width is set to 5. All hyperparameters are tuned on the development set.

Figure 9:
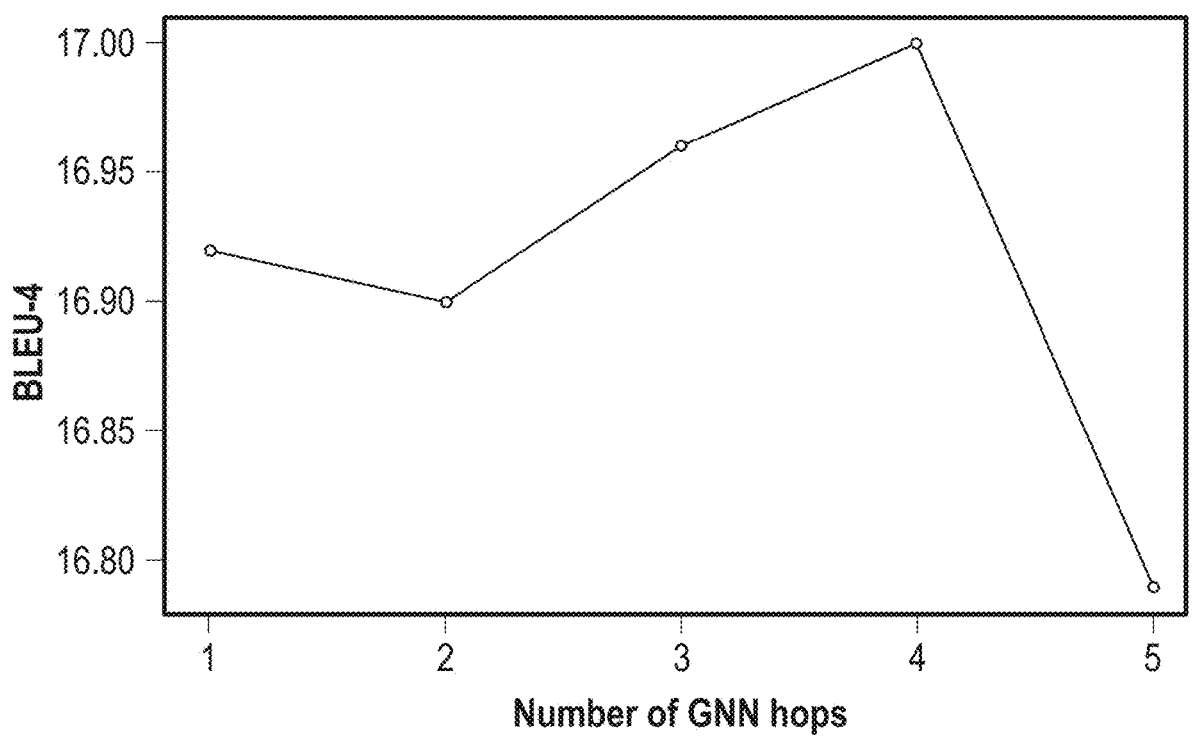
FIG. 9 is a graph showing the effect of the number of GNN hops, according to an aspect of the invention.

Sensitivity Analysis of Hyperparameters: To study the effect of the number of GNN hops, experiments were conducted on the G2S$_{sta}$ model on the SQuAD split-2 data. FIG. 9 shows that an exemplary model is not very sensitive to the number of GNN hops and can achieve reasonably good results with various number(s) of hops.

Details on Human Evaluation: a small-scale (i.e., 50 random examples per system) human evaluation was conducted on the split-2 data. Five human evaluators were asked to give feedback on the quality of questions generated by a set of anonymized competing systems. In each example, given a triple containing a source passage, a target answer and an anonymized system output, the evaluators were asked to rate the quality of the output by answering the following three questions: i) is this generated question syntactically correct? ii) is this generated question semantically correct? and iii) is this generated question relevant to the passage? For each evaluation question, the rating scale is from 1 to 5 where a higher score means better quality (i.e., 1: Poor, 2: Marginal, 3: Acceptable, 4: Good, 5: Excellent). Responses from all evaluators were collected and averaged.

Additional Details on Ablation Study: A comprehensive ablation study was performed to systematically assess the impact of different model components (e.g., BERT, RL, DAN, BiGGNN, FEAT, DAN-word, and DAN-hidden) for two proposed full model variants (static vs dynamic) on the SQuAD split-2 test set. Experimental results, shown in FIG. 10, confirmed that the components in one or more embodiments each make a contribution to the overall performance.

One or more embodiments provide techniques for using a computing device to generate a natural language question for utilization with a dialog system, including receiving, by a computing device, an input passage to ask a natural language question about. The natural language question is generated by the computing device. Also included are receiving, by the computing device, a target answer; and constructing, by the computing device, an input passage graph. The input passage graph includes one or more nodes, where each node represents a word in the input passage. Aspects further include utilizing, by the computing device, the input passage graph to generate the natural language question to result in the target answer.

In some instances, a bidirectional gated neural network is utilized to encode the input passage graphs.

One or more embodiments generate questions based on both the given text and answer information, which later can be used to train other systems such as a dialog agent. One or more embodiments employ advanced AI techniques such as graph neural networks with reinforcement learning from any given text and answer information.

Given the discussion thus far, it will be appreciated that, in general terms, an exemplary method, according to an aspect of the invention, includes for a passage text 305 and a corresponding answer text 307, performing a word-level soft alignment to obtain contextualized passage embeddings and contextualized answer embeddings; e.g., using network 303. Further steps include performing a hidden level soft alignment on the contextualized passage embeddings and the contextualized answer embeddings to obtain a passage embedding matrix; e.g., using network 303; and constructing a passage graph of the passage text based on the passage embedding matrix; e.g., using graph encoder 313. Still further steps include applying a bidirectional gated graph neural network 309 to the passage graph until a final state embedding is determined, during which application intermediate node embeddings are fused from both incoming 331 and outgoing 329 edges of the graph; obtaining a graph-level embedding 333 from the final state embedding; and decoding the final state embedding to generate an output sequence word-by-word (e.g., with decoder 335). An even further step includes training a machine learning model to generate at least one question corresponding to the passage text and the answer text, by evaluating the output sequence with a hybrid evaluator 341 combining cross-entropy evaluation 343 and reinforcement learning evaluation 345.

In some instances, constructing the passage graph of the passage text based on the passage embedding matrix includes initializing node embeddings for the passage graph to correspond to the passage embedding matrix (refer to above discussion wherein, in BiGGNN, node embeddings are initialized to the passage embeddings X returned by DAN. Further, in some instances, applying the bidirectional gated graph neural network to the passage graph until the final state embedding is determined includes, starting with the initial node embeddings, iteratively determining a plurality of the intermediate node embeddings with the bidirectional gated graph neural network, until the final state embedding is determined, the intermediate node embeddings are fused from both the incoming and the outgoing edges of the graph during each iteration. Refer to above discussion wherein, in one or more embodiments, the intermediate node embeddings are fused from both incoming and outgoing edges in every iteration during the training. In one or more cases, obtain the graph-level embedding from the final state embedding by applying linear projection and max pooling 337 to the final state embedding to obtain the graph-level embedding.

One or more embodiments further include using the trained machine learning module to respond to a user query. For example, the passage text, the answer text, the at least one question, and the user query can pertain to information technology, and a further step can include configuring at least one information technology asset (see examples in FIGS. 1, 2, and 11) in accordance with the response.

In some cases, training the machine learning model by evaluating the output sequence with the hybrid evaluator includes optimizing a reward function combining an evaluation metric reward function and a semantic reward function. Refer to the discussion of the hybrid evaluator 341.

In some cases, the training includes initial training with cross-entropy loss and fine-tuning to optimize a scaling factor combining cross-entropy loss and reinforcement learning loss. Refer to Equations 9, 10, and 11 and accompanying text: Eq. 9 is a reinforcement learning loss, and Eq. 10 is a regular loss—cross entropy. Eq. 11 is the combination of them so that a better loss function can be obtained.

Note that Equations (1) and (2) and accompanying text discuss aspects of soft alignment which, as discussed, can be applied specifically to word-level alignment and hidden-level alignment.

In some instances, the passage text includes a first collection of word tokens $X^p$; the corresponding answer text includes a second collection of word tokens $X^a$; and, in the step of decoding the final state embedding to generate the output sequence word-by-word, the output sequence includes a sequence of word tokens Y which maximizes a conditional probability of a corresponding question sequence. See discussion above of $\hat{Y}=\arg\max_Y P(Y|X^p,X^a)$.

In another aspect, an exemplary apparatus includes a memory (e.g. 30); a non-transitory computer readable medium (e.g. 34) including computer executable instructions; and at least one processor 16, coupled to the memory and the non-transitory computer readable medium, and operative to execute the instructions to be operative to instantiate a deep alignment network 303, a graph encoder 313 including a bidirectional gated graph neural network 309, a decoder 335, and a hybrid evaluator 341. The elements are in data communication with each other; for example, they may share data in common data structures in the memory.

Figure 11:
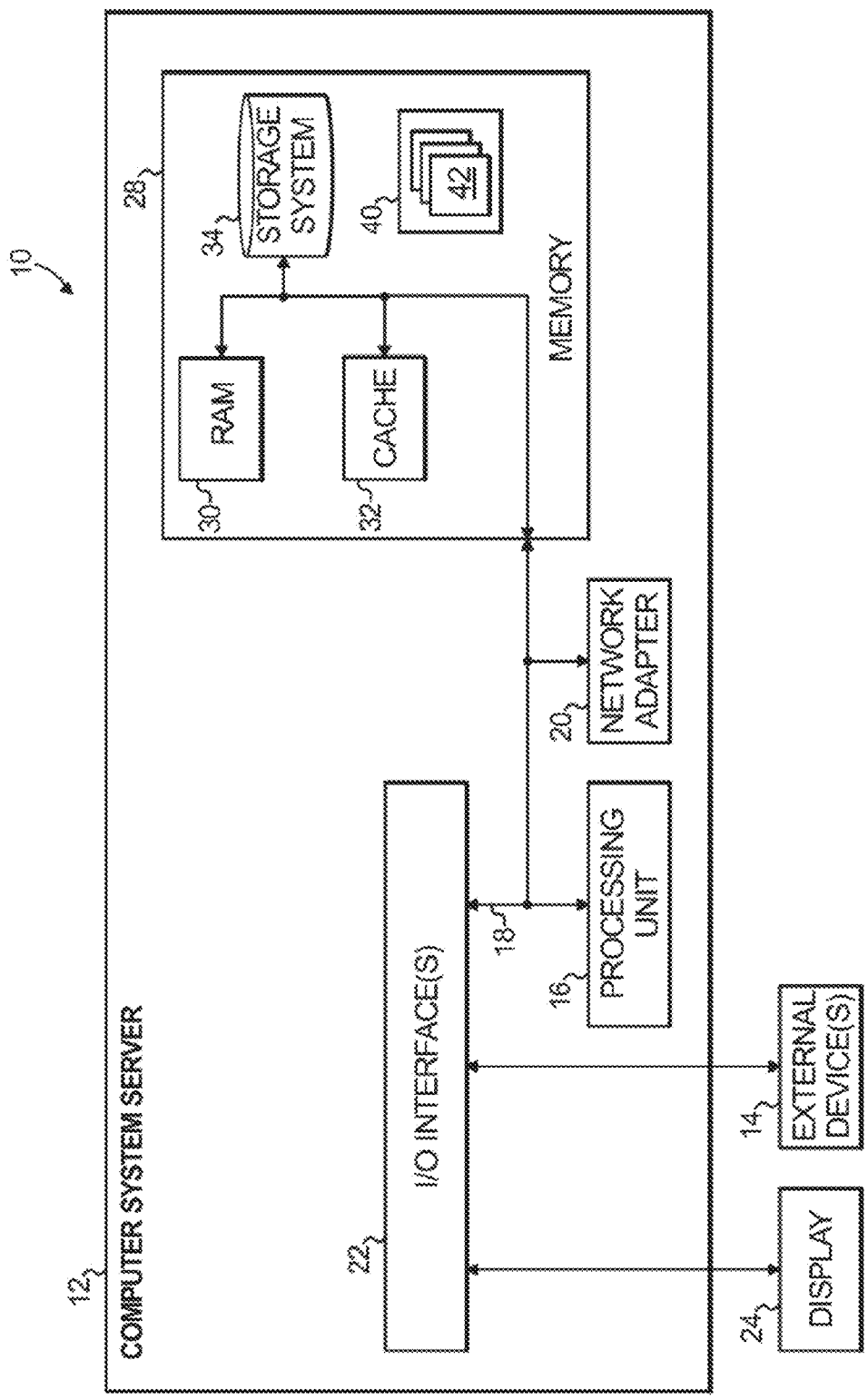
FIG. 11 depicts a computer system that may be useful in implementing one or more aspects and/or elements of the invention, also representative of a cloud computing node according to an embodiment of the present invention.

One or more embodiments of the invention, or elements thereof, can be implemented in the form of an apparatus including a memory and at least one processor that is coupled to the memory and operative to perform exemplary method steps. FIG. 11 depicts a computer system that may be useful in implementing one or more aspects and/or elements of the invention, also representative of a cloud computing node according to an embodiment of the present invention. Referring now to FIG. 11, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 11, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 11) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text. Consider, e.g., a cloud-based service 96 for fine-grained visual recognition in mobile augmented reality, located in layer 90.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    for a passage text and a corresponding answer text, performing a word-level soft alignment to obtain contextualized passage embeddings and contextualized answer embeddings;
    performing a hidden level soft alignment on said contextualized passage embeddings and said contextualized answer embeddings to obtain a passage embedding matrix;
    constructing a passage graph of said passage text based on said passage embedding matrix;
    applying a bidirectional gated graph neural network to said passage graph until a final state embedding is determined, during which application intermediate node embeddings are fused from both incoming and outgoing edges of said graph;
    obtaining a graph-level embedding from said final state embedding;
    decoding said final state embedding to generate an output sequence word-by-word; and
    training a machine learning model to generate at least one question corresponding to said passage text and said answer text, by evaluating said output sequence with a hybrid evaluator combining cross-entropy evaluation and reinforcement learning evaluation.

2. The method of claim 1, wherein:
    constructing said passage graph of said passage text based on said passage embedding matrix includes initializing node embeddings for said passage graph to correspond to said passage embedding matrix;
    applying said bidirectional gated graph neural network to said passage graph until said final state embedding is determined comprises, starting with said initial node embeddings, iteratively determining a plurality of said intermediate node embeddings with said bidirectional gated graph neural network, until said final state embedding is determined, wherein said intermediate node embeddings are fused from both said incoming and said outgoing edges of said graph during each iteration; and
    obtaining said graph-level embedding from said final state embedding comprises applying linear projection and max pooling to said final state embedding to obtain said graph-level embedding.

3. The method of claim 2, further comprising using said trained machine learning module to respond to a user query.

4. The method of claim 3, wherein said passage text, said answer text, said at least one question, and said user query pertain to information technology, further comprising configuring at least one information technology asset in accordance with said response.

5. The method of claim 2, wherein training said machine learning model by evaluating said output sequence with said hybrid evaluator comprises optimizing a reward function combining an evaluation metric reward function and a semantic reward function.

6. The method of claim 2, wherein said training comprises initial training with cross-entropy loss and fine-tuning to optimize a scaling factor combining cross-entropy loss and reinforcement learning loss.

7. The method of claim 2, wherein:
    said passage text comprises a first collection of word tokens;
    said corresponding answer text comprises a second collection of word tokens; and
    in said step of decoding said final state embedding to generate said output sequence word-by-word, said output sequence comprises a sequence of word tokens which maximizes a conditional probability of a corresponding question sequence.

8. A non-transitory computer readable medium comprising computer executable instructions which when executed by a computer cause the computer to perform a method of:
    for a passage text and a corresponding answer text, performing a word-level soft alignment to obtain contextualized passage embeddings and contextualized answer embeddings;
    performing a hidden level soft alignment on said contextualized passage embeddings and said contextualized answer embeddings to obtain a passage embedding matrix;
    constructing a passage graph of said passage text based on said passage embedding matrix;
    applying a bidirectional gated graph neural network to said passage graph until a final state embedding is determined, during which application intermediate node embeddings are fused from both incoming and outgoing edges of said graph;
    obtaining a graph-level embedding from said final state embedding;
    decoding said final state embedding to generate an output sequence word-by-word; and
    training a machine learning model to generate at least one question corresponding to said passage text and said answer text, by evaluating said output sequence with a hybrid evaluator combining cross-entropy evaluation and reinforcement learning evaluation.

9. The non-transitory computer readable medium of claim 8, wherein:
    constructing said passage graph of said passage text based on said passage embedding matrix includes initializing node embeddings for said passage graph to correspond to said passage embedding matrix;
    applying said bidirectional gated graph neural network to said passage graph until said final state embedding is determined comprises, starting with said initial node embeddings, iteratively determining a plurality of said intermediate node embeddings with said bidirectional gated graph neural network, until said final state embedding is determined, wherein said intermediate node embeddings are fused from both said incoming and said outgoing edges of said graph during each iteration; and obtaining said graph-level embedding from said final state embedding comprises applying linear projection and max pooling to said final state embedding to obtain said graph-level embedding.

10. The non-transitory computer readable medium of claim 9, wherein said method further comprises using said trained machine learning module to respond to a user query.

11. The non-transitory computer readable medium of claim 9, wherein training said machine learning model by evaluating said output sequence with said hybrid evaluator comprises optimizing a reward function combining an evaluation metric reward function and a semantic reward function.

12. The non-transitory computer readable medium of claim 9, wherein said training comprises initial training with cross-entropy loss and fine-tuning to optimize a scaling factor combining cross-entropy loss and reinforcement learning loss.

13. The non-transitory computer readable medium of claim 9, wherein:
said passage text comprises a first collection of word tokens;
said corresponding answer text comprises a second collection of word tokens; and
in said method step of decoding said final state embedding to generate said output sequence word-by-word, said output sequence comprises a sequence of word tokens which maximizes a conditional probability of a corresponding question sequence.

14. An apparatus comprising:
a memory;
a non-transitory computer readable medium comprising computer executable instructions; and
at least one processor, coupled to said memory and said non-transitory computer readable medium, and operative to execute said instructions to be operative to:
instantiate a deep alignment network, a graph encoder including a bidirectional gated graph neural network, a decoder, and a hybrid evaluator;
with said deep alignment network, for a passage text and a corresponding answer text, perform a word-level soft alignment to obtain contextualized passage embeddings and contextualized answer embeddings;
with said deep alignment network, perform a hidden level soft alignment on said contextualized passage embeddings and said contextualized answer embeddings to obtain a passage embedding matrix;
with said graph encoder, construct a passage graph of said passage text based on said passage embedding matrix;
apply said bidirectional gated graph neural network to said passage graph until a final state embedding is determined, during which application intermediate node embeddings are fused from both incoming and outgoing edges of said graph;
with said graph encoder, obtain a graph-level embedding from said final state embedding;
with said decoder, decode said final state embedding to generate an output sequence word-by-word; and
train a machine learning model to generate at least one question corresponding to said passage text and said answer text, by evaluating said output sequence with said hybrid evaluator combining cross-entropy evaluation and reinforcement learning evaluation.

15. The apparatus of claim 14, wherein:
constructing said passage graph of said passage text based on said passage embedding matrix includes initializing node embeddings for said passage graph to correspond to said passage embedding matrix;
applying said bidirectional gated graph neural network to said passage graph until said final state embedding is determined comprises, starting with said initial node embeddings, iteratively determining a plurality of said intermediate node embeddings with said bidirectional gated graph neural network, until said final state embedding is determined, wherein said intermediate node embeddings are fused from both said incoming and said outgoing edges of said graph during each iteration; and
obtaining said graph-level embedding from said final state embedding comprises applying linear projection and max pooling to said final state embedding to obtain said graph-level embedding.

16. The apparatus of claim 15, wherein said at least one processor is further operative to execute said instructions to use said trained machine learning module to respond to a user query.

17. The apparatus of claim 16, wherein said passage text, said answer text, said at least one question, and said user query pertain to information technology, wherein said at least one processor is further operative to execute said instructions to configure at least one information technology asset in accordance with said response.

18. The apparatus of claim 15, wherein training said machine learning model by evaluating said output sequence with said hybrid evaluator comprises optimizing a reward function combining an evaluation metric reward function and a semantic reward function.

19. The apparatus of claim 15, wherein said training comprises initial training with cross-entropy loss and fine-tuning to optimize a scaling factor combining cross-entropy loss and reinforcement learning loss.

20. The apparatus of claim 15, wherein:
said passage text comprises a first collection of word tokens;
said corresponding answer text comprises a second collection of word tokens; and
in said method step of decoding said final state embedding to generate said output sequence word-by-word, said output sequence comprises a sequence of word tokens which maximizes a conditional probability of a corresponding question sequence.

\* \* \* \* \*